(12) United States Patent
Laver et al.

(10) Patent No.: US 7,186,102 B2
(45) Date of Patent: Mar. 6, 2007

(54) APPARATUS AND METHOD FOR LOW-DENSITY CELLULAR WOOD PLASTIC COMPOSITES

(75) Inventors: Terry C. Laver, Oregon, WI (US); Brian Keller, Oregon, WI (US); Alfred B. England, Cincinnati, OH (US); David F. Dostal, Cambridge, WI (US)

(73) Assignee: Strandex Corporation, Madison, WI (US)

( * ) Notice: Subject to any disclaimer, the term of this patent is extended or adjusted under 35 U.S.C. 154(b) by 270 days.

(21) Appl. No.: 10/699,599

(22) Filed: Oct. 27, 2003

(65) Prior Publication Data

US 2005/0067729 A1 Mar. 31, 2005

Related U.S. Application Data

(63) Continuation-in-part of application No. PCT/US02/13188, filed on Apr. 26, 2002.

(60) Provisional application No. 60/286,848, filed on Apr. 26, 2001.

(51) Int. Cl.
B29C 44/20 (2006.01)

(52) U.S. Cl. .................. 425/4 C; 425/308; 425/133.5; 425/378.1

(58) Field of Classification Search ............... 425/4 C, 425/817 C, 308, 133.5, 378.1; 264/50, 51, 264/45.9
See application file for complete search history.

(56) References Cited

U.S. PATENT DOCUMENTS

| | | | | |
|---|---|---|---|---|
| 3,954,929 A | * | 5/1976 | Hoenke | 264/51 |
| 4,039,691 A | * | 8/1977 | Hildebolt | 426/511 |
| 4,455,761 A | * | 6/1984 | Terhune et al. | 34/397 |
| 4,613,471 A | * | 9/1986 | Harris | 264/40.1 |
| 5,160,674 A | * | 11/1992 | Colton et al. | 264/50 |
| 5,334,356 A | * | 8/1994 | Baldwin et al. | 422/133 |
| 5,474,722 A | * | 12/1995 | Woodhams | 264/45.3 |
| 5,516,472 A | * | 5/1996 | Laver | 264/118 |
| 5,753,161 A | | 5/1998 | Lightle et al. | |
| 5,827,462 A | * | 10/1998 | Brandt et al. | 264/179 |
| 5,866,264 A | * | 2/1999 | Zehner et al. | 428/481 |
| 6,117,924 A | * | 9/2000 | Brandt | 524/13 |
| 6,344,504 B1 | * | 2/2002 | Zehner et al. | 524/14 |
| 6,498,205 B1 | * | 12/2002 | Zehner | 524/14 |
| 6,808,375 B2 | * | 10/2004 | Klotzer | 425/4 C |
| 6,949,209 B2 | * | 9/2005 | Zander et al. | 264/51 |

FOREIGN PATENT DOCUMENTS

FR 2 248 138 A 5/1975

* cited by examiner

*Primary Examiner*—Joseph S. Del Sole
(74) *Attorney, Agent, or Firm*—DeWitt Ross & Stevens S.C.; Charles S. Sara

(57) ABSTRACT

A low-pressure $CO_2$ tank or an air compressor with a refrigerated air dryer is attached either at or after the vent zone of a standard twin-screw extruder. During or after extrusion, the gas is dissolved in the wood-plastic melt. The $CO_2$ expands which foams the wood-plastic material.

5 Claims, 5 Drawing Sheets

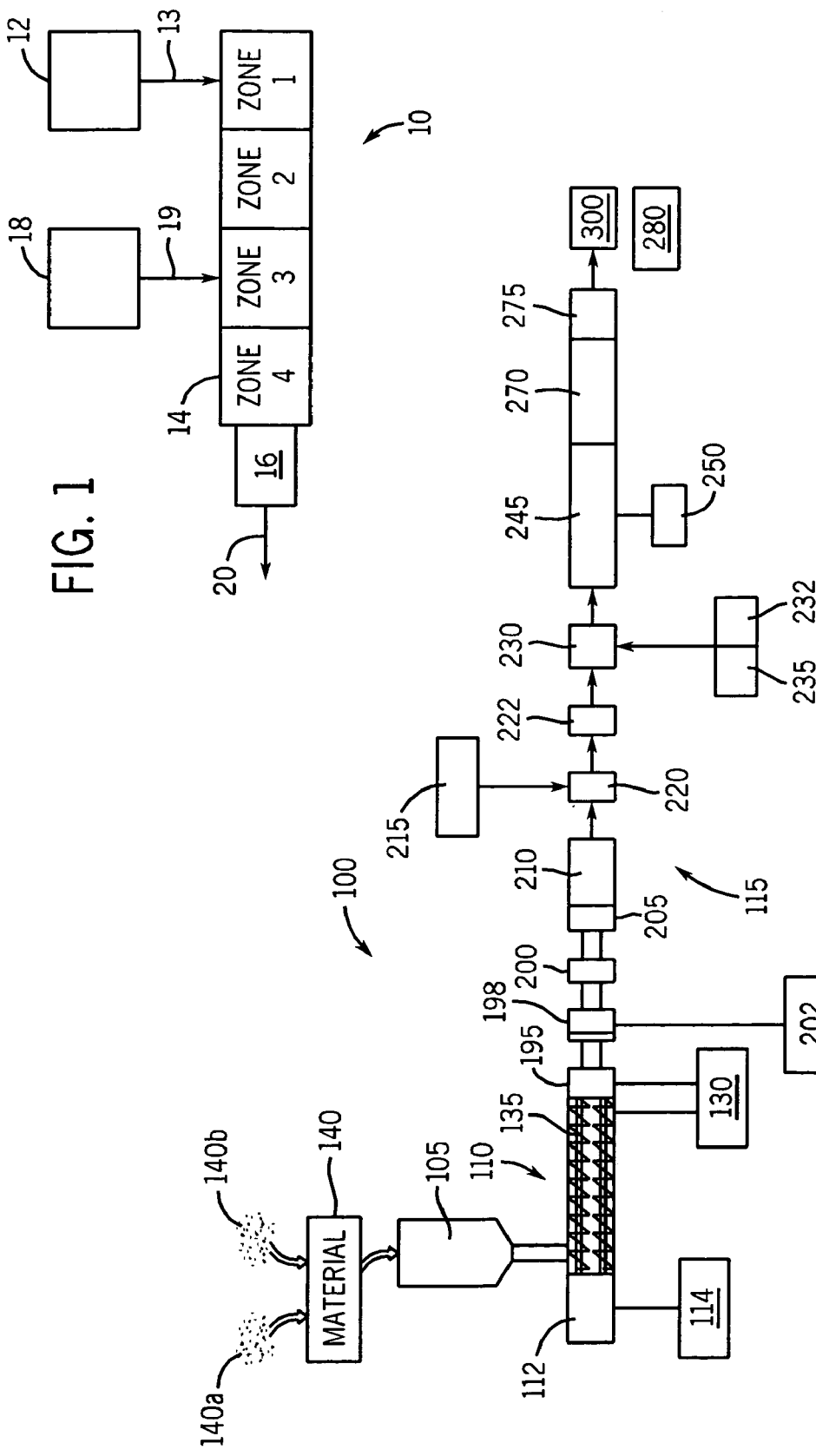

APPARATUS AND METHOD FOR LOW-DENSITY CELLULAR WOOD PLASTIC COMPOSITES

REFERENCE(S) TO RELATED APPLICATION(S)

This application is a continuation in part of PCT Application Number WO 02/088233 (PCT/US02/13188), filed Apr. 26, 2002, which claims priority on U.S. Provisional Patent Application Ser. No. 60/286,848, entitled "Extrusion of Low-Density Cellular Wood Plastic Composite Using Low Pressure Injection of Carbon Dioxide and Moisture Vapor From Wood as the Blowing Agent, filed Apr. 26, 2001, the entire contents of which are hereby expressly incorporated by reference into the present application.

GOVERNMENT FUNDING

Funding for the research for the invention disclosed in the parent application was in part provided by the U.S. Navy.

BACKGROUND OF THE INVENTION

1. Field of the Invention

The present invention is directed to an apparatus and method for producing an extruded cellular wood-plastic composite. The present invention is specifically directed to a system for manufacturing extruded wood-plastic composite of low density comprised of soft wood or hard wood flour and a thermoplastic resin injected with a gas such as carbon dioxide ($CO_2$) gas, nitrogen ($N_2$) gas, or air while the material is preferably between dies and after the extruder. The resin may be polyethylene, polypropylene, or any other thermoplastic suitable for use in a wood plastic composite. The wood plastic composite produced by this process may be preferably in the form of a foam core having a skin around it.

The current state of the art in the extrusion of cellular wood plastic composites produces cellular wood plastic composites containing poly-vinyl chloride (PVC), acrylonitrile butadiene styrene (ABS), polypropylene (PP), or polystyrene (PS) as the plastic resin. Foaming is accomplished through the use of chemical blowing agents that add an appreciable amount to the cost of the product. Significant weight reduction of the extruded material must be accomplished by the use of these blowing agents to offset the increased cost. The foams so produced are usually allowed to expand outward upon exiting from the die. The extruded profile is then shaped and sized by methods known to those practiced in the art. In an alternative process, the composite may be extruded as a hollow profile and allowed to expand or foam inward. The profile is contained in an appropriate device to maintain the extruded shape in this alternate process.

2. Discussion of the Related Art

Historically, physical blowing agents like carbon dioxide have been successfully used to form low-density microcellular plastics in an extrusion process. However, the process required injection of the blowing agent at high pressures, utilized high-impact polystyrene (HIPS) as the plastic resin, and did not involve a wood-plastic composite material. Extrusion processes using physical blowing agents, such as carbon dioxide, currently produce cellular plastic material made from high-density polyethylene (HDPE) and PP. However, the gas is introduced in high-pressure regions of the extruder and must be pumped into the extrusion at pressures between 1000 and 5000 psi.

Strength and stiffness of wood plastic composites decrease when they are foamed. This decrease is generally inversely proportional to the density of the foam. As a result, currently available elements such as deck boards are either of relatively high density (0.8–0.9 g/cm$^2$) or have a dense unfoamed, structural layer co-extruded on the outside of the foam. The co-extrusion process requires the use of a second extruder, which increases production times and costs.

What is needed therefore is an apparatus and process for better controlling the gas injected in the material to produce a more structurally sound plank. Further, what is also needed is an apparatus and process that is more efficient, practical and economical.

SUMMARY AND OBJECTS OF THE INVENTION

By way of summary, the present invention is directed to an apparatus and method for producing a composite plank. The apparatus has an extruder with a plurality of dies connected preferably outside of the extruder. The extruder is likely connected to a hopper containing wood and plastic material. A container or cylinder, also preferably outside the extruder, includes an orifice for injecting a gas. The material thus may first be heated in the hopper and then extruded into the dies and cylinder connected thereto where the melt material is injected with gas. A lubricating assembly connected to the dies shapes and forms a composite plank from the material. A cooling tank is preferably attached to the assembly to further cool the plank. A conveyor having opposing belts pulls the plank through the cooling tank. After exiting the cooling tank, a saw connected to the conveyor cuts the plank to size. The planks are then placed on a stacking table adjacent the saw.

The cylinder may contain a number of additional features. For example, the cylinder is preferably pressurized and contains a plurality of pins located in the center of the orifice and between two channels so that material extruded therein is uniformly injected with gas to cause it to foam before moving into a die. The cylinder is preferably located outside of the extruder to better control the amount of a) pressure present therein and b) gas added to the orifice to produce a better, more consistent end product. The pins in the cylinder allow gas to flow into the cylinder but are constructed to prevent backflow into the pins. In one embodiment, the cylinder adds a high pressure gas, such as oxygen, between the dies which are not located inside of the extruder. In this embodiment, the cylinder is mounted after an adapter die and before a transition die. A gas generator, a pressure booster, and a temperature controller are preferably connected to the cylinder to provide the orifice therein with gas at a controlled pressure, moisture content, and temperature.

The assembly has in one embodiment a temperature controller and a lubricator connected to the device. The assembly may apply heating and cooling to the plank. In one embodiment, the assembly acts as a molding cooler to quickly lower the temperature of the extruded material and thus shape the outer profile of the plank. Thus, the assembly may aid in forming an outer skin to the plank, sealing the plank and making the surface of the plank smooth.

A tempering block is connected to the assembly so that the extruded material can continue to expand to a preferred size in a controlled environment before being heated or cooled.

One method of manufacturing the plank includes placing the wood and plastic material in the hopper, mixing the material in the extruder and then extruding the material in the container located outside of the extruder, injecting gas inside the container and into the material to create foaming, shaping the extruded material with at least one die into a plank. Tempering of the plank in a controlled environment, such as a tempering block, to maximize foaming may also occur. Further shaping and sizing of the plank may occur by heating and cooling the material. Preferably, cooling the plank further happens in a cooling tank. Finally, a conveyor conveys the plank to a saw for further sizing. After cutting by the saw, stacking occurs at table adjacent the saw.

The present invention is also directed to a cellular wood plastic composite comprised of soft wood flour and high-density polyethylene wherein the ratio of wood flour to high-density polyethylene ranges from 1:4 to 3:2.

The present invention is further directed to a process for forming a stable cellular wood plastic composite of low density comprising: mixing finely ground wood flour with plastic in an extruder to form a plasticated mixture; introducing a blowing agent into the plasticated material under pressure sufficient to drive the blowing agent into the plasticated mixture to form cells within the plasticated mixture, wherein the blowing agent is introduced under a pressure gradient in the extruder sufficient to increase the solubility of the blowing agent in the plasticated mixture and under a temperature sufficient to prevent collapse of the cells; and reducing the pressure prior to removing the plasticated mixture from the extruder.

In another embodiment, the introduction of the gas or physical blowing agent takes place in the vent region of an extruder to allow the gas to be injected at low pressures using only a simple two-stage pressure regulator. No pump is required and no high-pressure piping is necessary.

In this process, mixing finely ground wood flour with the plastic enhances the foaming process. The number of cells per unit volume of the foam is increased and the density of the foam is decreased. The wood flour enhances the foaming process through two mechanisms with the first mechanism being the introduction of additional gases to the extrudate and the second being the altering of the viscosity of the extrudate. Residual moisture and other volatile gases are released from the wood during the extrusion process. These gases act as additional blowing agents. The wood flour also increases the viscosity of the extrudate. This allows the extrudate to be processed at higher melt pressures without these higher pressures causing back flow of the extrudate into the vent manifold of the extruder. The higher pressures allow the blowing agent to disperse throughout the resin more readily and more completely, resulting in improved cell structure and increased cell density.

The addition of wood flour decreases the cost of the material by displacing a more expensive ingredient (plastic resin) as well as increasing the stiffness of the foam. Therefore, an enhanced process to foam wood-plastic composites is accomplished.

One advantage of the present invention is that the expensive chemical blowing agent used in the prior art to produce a foamed wood-plastic composite is now replaced with a less-expensive physical blowing agent.

A second advantage is that a member may be produced with a dense outer layer and a foam core utilizing only one extruder. Additional advantages are the low cost method of introducing the blowing agent, the decreased cost of materials needed for production, and the increased stiffness of the product when compared to plastic foam.

The product may be used for decorative moldings inside or outside of a house, picture frames, furniture, porch decks, window molding, window components, door components, and roofing systems. Other types of use are contemplated.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 1 is a schematic illustrating the flow process of the invention;

FIG. 2 is a schematic showing a potential apparatus according to the present invention;

DETAILED DESCRIPTION OF THE PREFERRED EMBODIMENTS

Figure 4:
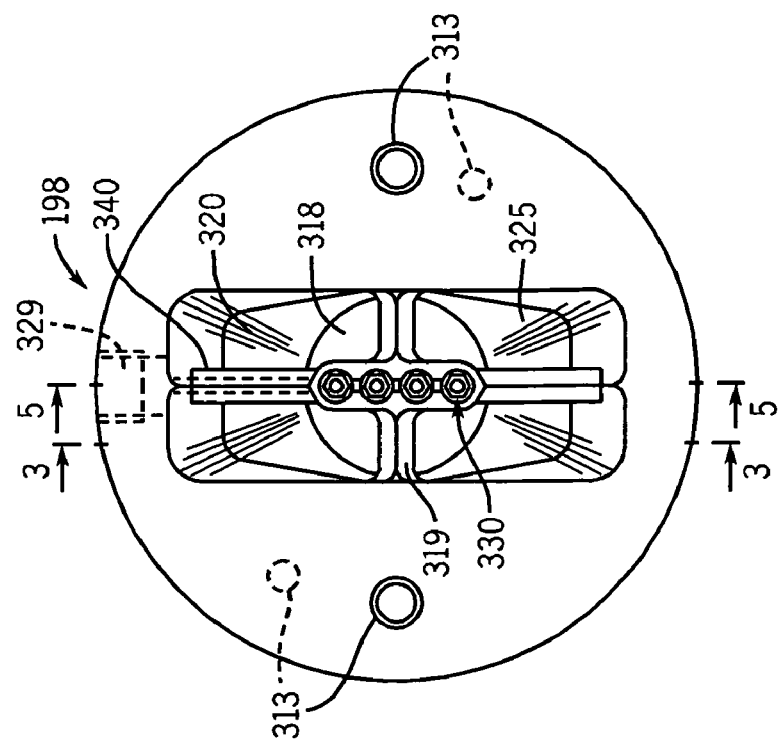
FIGS. 3–5 show various views of the pressurized container including cutaway views according to one embodiment of the present invention.

In describing the preferred embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

Specific embodiments of the present invention will now be further described by the following, non-limiting examples which will serve to illustrate various features of significance. The examples are intended merely to facilitate an understanding of ways in which the present invention may be practiced and to further enable those of skill in the art to practice the present invention. Accordingly, the examples should not be construed as limiting the scope of the present invention.

Wood Flour Example: Wood flour with a particle size of 40 mesh or smaller derived from either hard or soft wood species may be used. Preferably the particle size is 60 mesh or smaller. The moisture content of the wood flour may vary from less than 1% to 9%. Higher moisture content results in lower density foam but increases cell size and increases the presence of voids in the foam structure. Preferably for most applications the wood is dried to 1% moisture content.

Drying technologies are known to the art. A suitable example is a desiccant dryer manufactured by Premier Pneumatics, Inc. (Allentown, Pa.).

While wood flour is the preferred material for the present invention, it is within the scope of the present invention to use a variety of cellulosic materials from sawdust to pond sludge and newspapers. The cellulosic material may also be a raw material including old newspapers, alfalfa, wheat pulp, wood chips, wood flakes, wood fibers, ground wood, wood veneers, wood laminates, kenaf, paper, cardboard, straw, and other cellulosic fibrous materials.

Prior to being combined with the other starting materials, the cellulosic materials should be dried to moisture content between approximately 1% and 9%. Preferred moisture content is no more than 2%. Drying technologies are known to the art. A suitable example is a desiccant dryer manufactured by Premier Pneumatics, Inc. (Allentown, Pa.).

Example of Thermoplastic Materials:

The thermoplastic materials serve primarily as a process fluidizer. Most types of thermoplastic materials may be used, examples of which include multi-layer films, virgin thermoplastics such as polyethylene, polypropylene, poly-vinyl chloride (PVC), low density polyethylene (LDPE), ethyl-vinyl acetate and waste plastic sawdust from other industries as well as other recyclable polymer materials.

Thermoplastic materials are essential to the process of the present invention. The developing cells in the mixture are formed in the thermoplastic portion of the material matrix. Preferred types of thermoplastic materials that may be used are HDPE and PP. The ratio of cellulosic fibers to the thermoplastic material is between approximately 3:2 and 1:4. Preferably the ratio between the cellulosic fibers to the thermoplastic material is approximately 2:3.

Extruder Example

Reference is made to U.S. Pat. No. 5,516,472 to Laver, which is incorporated herein by reference, for a description of a suitable extruder. An example is a Cincinnati Milacron E55 counter-rotating intermeshing twin-screw extruder with triple flights, which is used to produce the cellular material. It is possible to control the temperature of the extrudate by utilizing the temperature controllers for the four-barrel zones and the screws of the E55 twin-screw extruder. The openings in the vent manifold that normally hold the sight glasses are plugged by covering them with a high temperature gasket and a 0.5 inch thick aluminum plate. The piping running from the vent manifold to the extruder vacuum system is modified by the addition of a ball valve on the vacuum line and a coupler (for connection of the $CO_2$ bottle or compressed air line) onto the vent manifold bleeder valve assembly.

Blowing Agent Examples

Blowing agents are added to decrease density by creating small bubbles or cells in the material. The venting section of the screws provides an area for introduction of the blowing agent under low pressure. Carbon dioxide or nitrogen from a standard 50 pound gas bottle or compressed air produced by a common air-compressor and dried by passing through a refrigerated air dryer is injected into the extruder barrel using a two-stage regulator in the case of the bottled gases or a single stage regulator in the case of the compressed air.

Other Additives

Other additives, as described in U.S. Pat. No. 5,516,472 to Laver, can be included to achieve maximum commercialization of this product. Additives include cross-linking agents, lubricants, compatibilizers, and accelerators.

Operation Example 1

Referring now to FIG. 1, the basic principles of the present invention follow. FIG. 1 illustrates a twin-screw extruder 10, which is known to the art. The extruder provides many projections and grooves that knead the materials causing them to combine more completely. The extruder 10 includes a hopper 12 to receive and form a mixture of the wood flour and the thermoplastic material, the extruder body 14 for extruding the mixture; and a die 16 connected to the extruder.

The mixing of the materials prior to loading the extruder 10 may be accomplished by any simple mixing device. No heat is required during mixing and only an even distribution of the various components is required. A drum tumbler may be used for small quantities or a larger batch-type mixer such as a ribbon blender known to the art may be used. A typical feed hopper 12 used in this process may be a gravity feed, starve feed or force-feed (also known as a "crammer") hopper, depending on the flow characteristics of the particular compound.

The mixture of raw materials is then delivered to a heated extruder 14. The extruder 14 utilizes low temperature mixing and extruding. This is unique in that most plastic mixing processes require mixing at a plasticization temperature, which is quite high. The present mixing temperature is substantially lower, preferably around 340° F. (171° C.). The material passing through the mixing zone of the extruder creates a mass of homogenous material at a certain temperature, approximately 325° F. (163° C.)–350° F. (177° C.) depending upon the particular compound.

The present invention can be processed with any capacity extruder. A counter-rotating and intermeshing twin screw, high pressure, extruder manufactured by Cincinnati Milacron (CM-55-HP) may be used in the preferred embodiment.

Preferably, the process is accomplished by twin-screw extruders, which are heated to process temperatures sufficient to blend the product together into a homogenous mixture at low temperature.

The temperature of the extrudate is controlled at a level that is 5–15° F. (2.7–8.3° C.) above the crystallization temperature of the thermoplastic. This prevents collapse of the product formed as will be described further on.

The temperature of the extruder used in the present invention is controlled by the extrusion speed, external extruder heaters, shearing action and heaters in the die system and monitored by thermocouples (not shown) and other monitoring circuits. The purpose of the thermocouples is to monitor the heat at each station.

Flow Rate Examples:

The flow rate of the extruder 14 is typically between about 100 and 2500 pounds per hour. In the preferred embodiment the flow rate is approximately 300 pounds per hour with a temperature at approximately 270° F. (132° C.)–325° F. (163° C.).

The product leaving the extruder is essentially unbounded round stock. Various sized extruder orifices are available with a range from 25 millimeters (mm) to 72 mm. In the preferred embodiment a 38 mm orifice is used.

As illustrated in FIG. 1, the extruder body 14 is segmented into four zones (zones 1, 2, 3 and 4). Zone 1 is the feed zone where the powdered or granular materials enter the flights of the screws from the hopper 12, via line 13. Heat applied from external sources and produced through shearing of the extrudate by the screws begins to melt the thermoplastic in this zone. In the preferred embodiment the temperature of this zone is maintained at 325° F. (163° C.). Zone 2 is the first metering zone. In this zone, a seal is formed between the extruder barrel and the screws, which restricts the transfer of pressures developed in the vent zone (zone 3) back to the feed zone (zone 1). The temperature of this zone in the preferred embodiment is 340° F. (171° C.). Zone 3 is the vent zone. Due to the isolation of this zone by the seal formed in zone 2, positive or negative pressure may be maintained in the vent zone. In the preferred embodiment the blowing agent is present in this zone at a positive pressure of 60 psi and the temperature is maintained at 325° F. (163° C.). Zone 4 is the second metering zone. The screw flights in this zone are designed to provide a pumping action that is capable of forcing the extrudate through the die at pressures of 600 psi–6000 psi. Blowing agent introduced in the vent zone is incorporated into the extrusion mass as a solute in zone 4. This zone also serves to cool the extrudate to a temperature suitable for production of cellular foam. In the preferred embodiment the temperature of zone 4 is maintained at 270° F. (132° C.). The temperature of the screws may also be controlled. In the preferred embodiment the screw temperature is maintained at 290–300° F. (143–149° C.).

The gaseous form of the blowing agent, typically $CO_2$ or air, which is 15 located at unit 18, is injected into the extruder via line 19 typically at zone 3 under pressures of 40 psi to 500 psi, preferably under 200 psi, in the vent region of the extruder. The blowing agent and volatile gases given off by the wood flour are mixed with the plasticated material in zone 4 of the extruder under pressures of 1400 psi to 3800 psi in order to drive them into solution. A pressure gradient is maintained in the extruder and die to increase the solubility of the blowing agent in the plastic. The temperature of the extrudate is controlled at a level that is 5–15° F. (2.7–8.3° C.) above the crystallization temperature of the thermoplastic. This prevents collapse of the cells formed when the blowing agent comes out of solution near the die exit. The pressure is released in a steep gradient, i.e., the pressure is reduced rapidly as the end of the die is approached and is completely released when the extrudate exits the die. The foam 20 is allowed to expand outward as it exits the die 16 producing a lightweight cellular product or alternatively is extruded as a hollow shape with the exterior being contained and cooled to produce a dense strong skin while the foam is allowed to expand into and fill the interior of the shape.

Die Configuration Examples

Two die configurations are preferred for foam production.

1. The cellular material can be produced by foaming outward from a die of a size and length necessary for production of the required pressure drop. A die in the shape of a 3-inch by 0.5-inch slot with corner fillets 0.25 inch in radius was used. The length of the slot was 2.25 inches. Rigid foam with a density of 0.42 g/cm was produced from high-density polyethylene (HDPE) (Equistar LB 010000) using this configuration.

Cellular materials were then formed from composites containing HDPE and maple wood flour with the relative proportions being varied. Composites containing 20, 30, 40 and 50% wood by weight were successfully foamed. Foamed samples were selected at random from each category. Sample mass was measured on a digital electronic balance. Sample volume was determined by volume displacement of water. This method was used because of the irregular shape of a foam sample and the presence of voids in the material. The results are shown in Table 1. Production of low-density foams was possible with composites containing 20, 30, and 40% wood and medium density foam was produced with a composite containing 50% wood.

TABLE 1

Densities of Extruded Cellular Materials

| | Material HDPE | 1% talc | 20% maple | 30% maple | 40% maple | 50% maple |
|---|---|---|---|---|---|---|
| sample density g/cm$^3$ | 0.44 | 0.44 | 0.26 | 0.22 | 0.22 | 0.53 |
| | 0.41 | 0.42 | 0.23 | 0.29 | 0.23 | 0.54 |
| | 0.39 | 0.40 | 0.25 | 0.25 | 0.24 | 0.48 |
| | 0.42 | 0.43 | 0.25 | 0.28 | 0.23 | 0.44 |
| | 0.46 | 0.48 | 0.25 | 0.27 | 0.24 | 0.44 |
| | 0.42 | 0.44 | 0.22 | 0.27 | | 0.46 |
| average density | 0.42 | 0.43 | 0.24 | 0.27 | 0.23 | 0.48 |

Subsequently a die was cut explicitly for the extrusion of wood plastic composite foam. The densities of the foams produced from composites containing 40% wood using this die are presented in Table 2.

TABLE 2

Densities of Cellular Materials Extruded with Differing Moisture Levels and Blowing Agent

| Wood Moisture Content (%)* | Blowing Agent | Mean Density (g/cm$^2$) | St. Dev. |
|---|---|---|---|
| 0.89% | None | 0.954 | 0.043 |
| | $CO_2$ 60 psi | 0.409 | 0.031 |
| | $CO_2$ 100 psi | 0.488 | 0.023 |
| | $CO_2$ 160 psi | 0.571 | 0.022 |
| | Air 60 psi | 0.525 | 0.060 |
| | Air 100 psi | 0.422 | 0.030 |
| 3.47% | None | 0.616 | 0.126 |
| | $CO_2$ 60 psi | 0.302 | 0.035 |
| | Air 100 psi | 0.401 | 0.017 |
| 6.21% | None | 0.325 | 0.021 |
| | $CO_2$ 60 psi | 0.254 | 0.017 |
| | Air 100 psi | 0.283 | 0.016 |
| 8.58% | None | 0.323 | 0.019 |
| | $CO_2$ 60 psi | 0.260 | 0.067 |
| | Air 100 psi | 0.309 | 0.061 |

*Wood level is 40%

The data presented in Table 2 illustrate the synergistic effect of the added blowing agent and the volatile compounds present in the wood flour. Wood flour added to the composites in this trial was either undried or dried at one of three specific temperatures. As a result four different wood moisture levels were tested. These were 8.58% (undried), 6.21% (dried at 150° F.), 3.47% (dried at 235° F.), and 0.89% (dried at 325° F.). As seen in Table 2, the lowest foam densities are obtained when adding $CO_2$ as an additional blowing agent, followed by adding air as an additional blowing agent. The effect of injection pressure on foam density varies with blowing agent. Increasing injection pressure of air causes a decrease in density while increasing injection pressure of $CO_2$ causes an increase in foam density. Use of volatile compounds from the wood alone results in the highest foam densities. Foam density also is seen to decrease as the wood moisture level increases. This data indicates that low foam densities may be achieved through the process described here and that the addition of wood flour to the plastic resin enhances the foaming process.

2. The cellular material can be produced by extrusion of the wood plastic composite through a die designed to produce a hollow profile. This type of die typically has a mandrel that forms the interior of the hollow. This type of die may be of the type described in U.S. Pat. No. 5,516,472 to Layer. When this type of die is used, extruding the material through the stranding die develops the pressure needed for the incorporation of the blowing agent. The foam produced in this way can be allowed to expand freely or can be contained. If the foam is to be contained, a cooled calibrator whose inner surface matches the desired shape of the member is attached to the die so that the mandrel extends into the cavity of the calibrator. This results in the formation of a solidified skin on the exterior of the composite that has not been allowed to foam. The interior of the profile is not yet solidified when the extrudate reaches the end of the mandrel. This material is allowed to foam into the interior of the profile creating a solid foam core surrounded by an unfoamed skin. The profiles produced in this manner may be made in intricate shapes. The skin thickness and profile dimensions can be designed so that a member suitable for use as a deck board may be produced.

then pressed together for two minutes. Specimens were allowed to cool to room temperature overnight and were tested in flexure. Two types of specimens were made and tested. One type was made from foam containing 20% wood and the other from foam containing 30% wood. The flanges for both types were made from a formulation containing 58% wood, 31% HDPE, 8% talc, 2% zinc stearate, and 1% LBS wax.

The specimens made from 20% wood foam were broken in flexure on a mechanical type universal testing machine (United Model SFM-10, Huntington Beach, Calif.). An automated testing procedure was used which uses deflection control and halts the test when a reduction in load occurs. For the 20% wood foam samples, the test stopped when the bottom flange failed. No failure had occurred in the foam core this time.

The specimens were then rotated and tested with the other flange in tension. The results show a reduction in stiffness for the second test but no difference in strength. The 30% wood core foam specimens were broken in flexure on an Instron Model 4466 (Canton, Mass.) mechanical type universal testing machine. Failure of the foam core resulted simultaneously with failure of the bottom flange for the specimens. Twelve specimens were tested but four delaminated and data from those were not used. Mechanical properties of the 20% foam core laminates, the 20% foam core laminates broken from the second side, the 30% foam core laminates, and the control 2-box section are presented in Table 3.

TABLE 3

| | | Density (lb. ft-3) | Modulus (psi) | EI (lb-in$^2$) | Rupture (psi) | Strain at failure |
|---|---|---|---|---|---|---|
| Control 2-Box as Solid Section | Average | 30.629 | 298686 | 233878 | 1570 | 0.010 |
| | Standard deviation | 0.253 | 7184 | 2906 | 23 | 0.000 |
| | Coefficient of variation | 0.8% | 2.4% | 1.2% | 1.5% | 3.2% |
| 20% Wood Foam Laminate | Average | 37.032 | 216064 | 179768 | 1304 | 0.011 |
| | Standard deviation | 0.765 | 17962 | 13940 | 136 | 0.002 |
| | Coefficient of variation | 2.1% | 8.3% | 7.8% | 10.4% | 20.3% |
| 20% Wood Foam Laminate Other Side | Average | 37.032 | 154916 | 129661 | 1357 | 0.015 |
| | Standard deviation | 0.765 | 18080 | 15581 | 58 | 0.000 |
| | Coefficient of variation | 2.1% | 11.7% | 12.0% | 4.3% | 2.8% |
| 30% Wood Foam Laminate | Average | 36.987 | 255175 | 180068 | 1528 | 0.013 |
| | Standard deviation | 1.887 | 33802 | 25113 | 147 | 0.001 |
| | Coefficient of variation | 5.1% | 13.2% | 13.9% | 9.6% | 8.2% |

Sample Embodiment 1

To investigate the properties of foam core composites that could be produced, laminates were made with outer flanges of high density wood-plastic composite material with a foam block melt bonded between them. Both the foam block and high-density flanges were heated on a platen of a hot press set at 170° C. for two minutes. The two heated surfaces were These values indicate that a laminate produced by co extrusion of high density wood-plastic composite with a cellular wood plastic core will perform in a manner similar to a hollow net section of the high density material when loaded in flexure. The foam core will add resistance to impact and buckling not present in the net section.

Members were produced by both extrusion and co-extrusion processes through the foaming process described above using die configuration 2 in which the profile is contained as it is cooled. The members produced by co-extrusion are referred to as laminated members in the following paragraphs. The flanges for the laminated members were made from a formulation containing 58% wood, 31% FIDPE, 8% talc, 2% zinc stearate, and 1% EBS wax. The formulation of the foam core material was 60% HDPE and 40% wood fiber. The same 60%–40% formulation was used in the production of cellular composite members produced by simple extrusion (without high density flanges).

A laminated member consisting of high-density wood-plastic composite flanges with a foam core was produced by co-extrusion of the two materials. The member was produced with a 2 inch wide by 6 inch deep cross section made up of a high density wood-plastic composite flange 2 inch wide by 0.9 inch deep on the top and bottom of the section with a 2 inch by 4.2 inch foam core between the two flanges. The foam core contained 40% wood fiber in this instance. Members with this profile were tested according to ASTM standard D6109 "Standard Test Methods for Flexural Properties of Unreinforced and Reinforced Plastic Lumber" test method "B", edgewise testing. Data from this test are Table 4.

TABLE 4

Stiffness and Strength of Composite Joist Members

| Specimen # | Composite Density lbs/ft$^3$ | Composite I (in$^4$) | Composite MOE (psi) | Composite EI (lb-in$^2$) | Composite MOR (psi) |
|---|---|---|---|---|---|
| 1 | 39.60 | 33.07 | 399990 | 13227795 | 1484 |
| 2 | 39.69 | 33.07 | 353125 | 11677957 | 1326 |
| 3 | 41.03 | 33.07 | 376295 | 12444173 | 1360 |
| 4 | 38.96 | 33.07 | 359077 | 11874778 | 1281 |
| 5 | 40.12 | 33.07 | 386136 | 12769613 | 1332 |
| 6 | 40.30 | 33.07 | 388896 | 12860894 | 1324 |
| 7 | 39.25 | 33.07 | 372962 | 12333941 | 1245 |
| 8 | 40.38 | 33.07 | 386320 | 12775699 | 1308 |
| 9 | 40.38 | 33.07 | 387608 | 12818306 | 1321 |
| Average | 39.97 | | 378934 | 12531462 | 1331 |
| STDEV | 0.646 | 5501 | 15113.232 | 499798.8 | 66.1 |
| COV | 1.62% | 3.99% | 3.99% | 4.97% | |

A laminated member was co-extruded with a profile 5.5 inch wide by 1.4 inch deep high-density wood-plastic composite flange 5.5 inch wide by 0.2 inch deep on tom with a foam core 5.5 inch wide by 1.0 inch deep between the two flanges. The foam core again contained 40% wood fiber. This profile was tested according to ASTM standard D6109 test method "A", flatwise testing. This configuration simulates use as decking material. Results of this test are shown in Table 5.

TABLE 5

Stiffness and Strength of Composite Deck Members

| Specimen # | Composite Density lbs/ft$^3$ | Composite I (in$^4$) | Composite MOE (psi) | Composite EI (lb-in$^2$) | Composite MOR (psi) |
|---|---|---|---|---|---|
| 1 | 37.8 | 1.31 | 386979 | 505493 | 1793 |
| 2 | 39.7 | 1.21 | 333147 | 403909 | 1489 |
| 3 | 38.8 | 1.87 | 310653 | 579478 | 1424 |
| 4 | 42.2 | 1.22 | 362221 | 441411 | 1312 |
| 5 | 39.3 | 1.20 | 358992 | 431874 | 1660 |
| 6 | 37.7 | 1.32 | 385298 | 506917 | 1659 |
| 7 | 41.2 | 2.27 | 340056 | 771111 | 1692 |
| 8 | 40.8 | 2.15 | 366480 | 788590 | 1682 |

TABLE 5-continued

Stiffness and Strength of Composite Deck Members

| Specimen # | Composite Density lbs/ft$^3$ | Composite I (in$^4$) | Composite MOE (psi) | Composite EI (lb-in$^2$) | Composite MOR (psi) |
|---|---|---|---|---|---|
| 9 | 37.1 | 1.40 | 340098 | 476823 | 1800 |
| 10 | 36.4 | 1.92 | 277485 | 531545 | 1409 |
| Average | 39.1 | 1.6 | 346140.9 | 543715.2 | 1592.0 |
| STDEV | 1.9 | 0.4 | 33753.7 | 134540.4 | 170.5 |
| COV | 4.9% | 26.4% | 9.8% | 24.7% | 10.7% |

The data presented in Tables 4 and 5 show that the foaming process described above may be used in a co-extrusion process to produce a wood plastic composite member with properties suitable for some structural applications. Furthermore the composite density of this member is comparable to solid wood (20 to 45 lb/ft$^3$).

A member with a cross section 5.5 inch wide by 1 inch deep was produced by extrusion of cellular wood plastic composite through the process described above using die configuration 2. Use of this die configuration results in the formation of a dense skin on the surface of the profile. This skin adds strength and stiffness to the member. This profile was tested according to ASTM standard D6109, test method "A", flatwise testing. Results of this test are shown in Table 6.

TABLE 6

Stiffness and Strength of Cellular Composite Member

| Specimen No. | Density (lb.&) | MOE (psi) | MOR (psi) |
|---|---|---|---|
| 1 | 31.7 | 133909 | 1421 |
| 2 | 28.3 | 125707 | 1357 |
| 3 | 33.6 | 178323 | 1585 |
| 4 | 34.2 | 160698 | 1667 |
| 5 | 28.4 | 157008 | 1325 |
| 6 | 27.3 | 127933 | 1271 |
| 7 | 32.4 | 164235 | 1723 |
| 8 | 31.3 | 182532 | 1728 |
| 9 | 28.1 | 120159 | 1220 |
| 10 | 29.8 | 136593 | 1536 |
| Average | 30.5 | 148709.7 | 1483.3 |
| STDEV | 2.5 | 22648.1 | 189.5 |
| COV | 8.1% | 15.2% | 12.8% |

Testing was done according to ASTM standard D790, "Standard Test Methods for Flexural Properties of Unreinforced and Reinforced Plastics and Electrical Insulating Materials." Results of this test are shown in Table 7.

TABLE 7

Flexural Properties of Decorative Molding

| Specimen no. | Density (lb.&) | MOE (psi) | MOR (psi) |
|---|---|---|---|
| 1 | 38.2 | 204461 | 2266 |
| 2 | 38.0 | 215264 | 2204 |
| 3 | 38.0 | 222622 | 2273 |
| 4 | 36.8 | 205046 | 2057 |
| 5 | 37.6 | 216388 | 2145 |
| 6 | 37.5 | 218943 | 2171 |
| 7 | 37.6 | 179916 | 2217 |
| 8 | 39.3 | 187471 | 2316 |
| 9 | 37.0 | 188736 | 2182 |
| 10 | 37.9 | 190002 | 2158 |

TABLE 7-continued

Flexural Properties of Decorative Molding

| Specimen no. | Density (lb.&) | MOE (psi) | MOR (psi) |
|---|---|---|---|
| Average | 37.8 | 202885 | 2199 |
| STDEV | 0.7 | 15353 | 74 |
| COV | 1.8% | 7.6% | 3.4% |

Tables 6 and 7 show that the low pressure foaming process may be used to produce members having a density within the range of natural solid wood that have sufficient material properties for use as building materials. Furthermore, the low-pressure foaming process may be used to produce intricate and decorative shapes with the outward appearance of finished natural wood.

Additional Embodiment

As best shown in the preferred embodiment of FIG. 2, the composite plank formation apparatus 100 consists of a hopper 105 and an extruder 110. The extruder is comprised of the gearbox 112 temperature control and lubricator 114 and screw mechanism 135. In the preferred embodiment the screw mechanism 135 is a twin-screw arrangement. Here also the extruder mixes the wood and plastic material and then extrudes it. A gas/moisture vacuum pump 130 may also be attached to the screw 135 to vent off any excess gas or moisture during the mixing process. Material 140 is added to the hopper 105. As mentioned above, the material 140 preferably consists of a wood flour and recycled or virgin plastic granules.

In this preferred embodiment, the system 100 has dies comprised of an adapter die, a transition die, a stranding die, a molding die and a setting die separate from the extruder. This configuration is shown in U.S. Pat. No. 5,516,472 to Laver which is hereby incorporated by reference herein for this purpose. However, there is one important change to note in the configuration of the dies in the '472 patent and in this embodiment of the present invention. The present invention has the pressurized container added between two of the dies as will be better explained below.

The adapter die 195 is connected to the extruder 110. The adapter die 195 is preferably outside the housing of the extruder. In fact, all of the attached dies in the system 100 are outside the housing of the extruder 110. The pressurized cylinder or container 198 is connected to the adapter die 195. The container 198 is preferably formed in a first section and a second section. In one embodiment a pump 202 is connected to a gas generator and temperature controller 204 and is used to inject gas into the container 198. The transition die 200 is connected to the container 198. The stranding die 205 and a molding die 210 follow preferably in sequence the transition die 200. The heating unit 215 is attached to the setting die 220 which is connected to molding die 210. The tempering block 222 follows setting die 220 and contains an environment to allow the extruded material to continue to foam without any additional pressure or change in temperature. Following tempering block 222 is a lubricating assembly or calibrator 230. The calibrator 230 is preferably connected to a heating and cooling vacuum unit 235. A temperature controller 232 is connected to the heating and cooling vacuum unit 235. Following the calibrator 230 is a cooling tank 245 which is connected to a chiller 250 for further cooling the material 140 to form a foam-like plank 300.

A puller 270 pulls the foam plank through the cooling tank 245 until it reaches a saw 275 adjacent that cooling tank 245. This saw 275 is used to further size the plank 300. The plank 300 is then conveyed to a stacking table 280.

Figure 3:
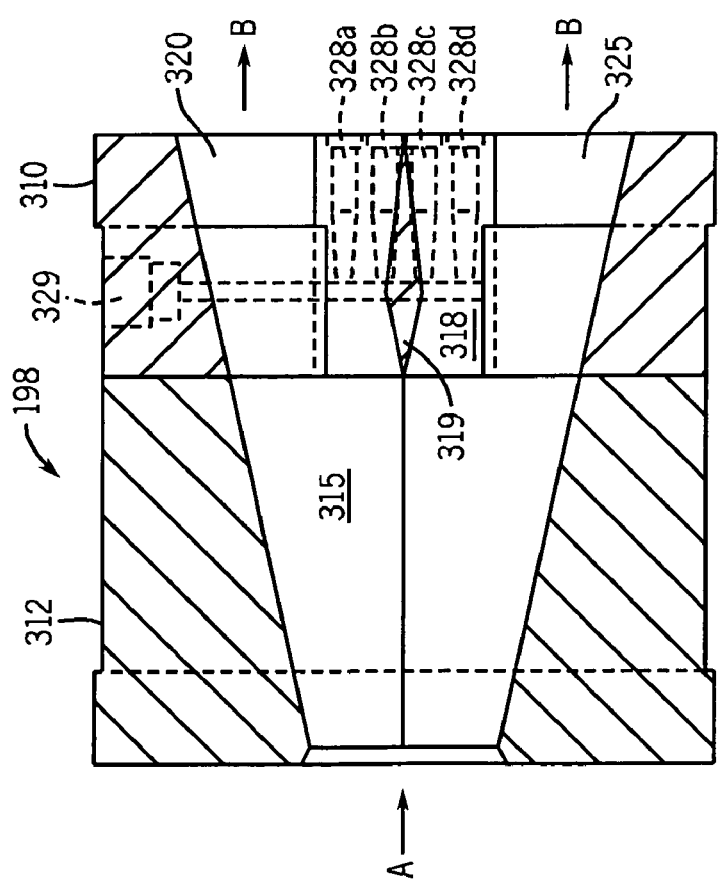
Figure 5:
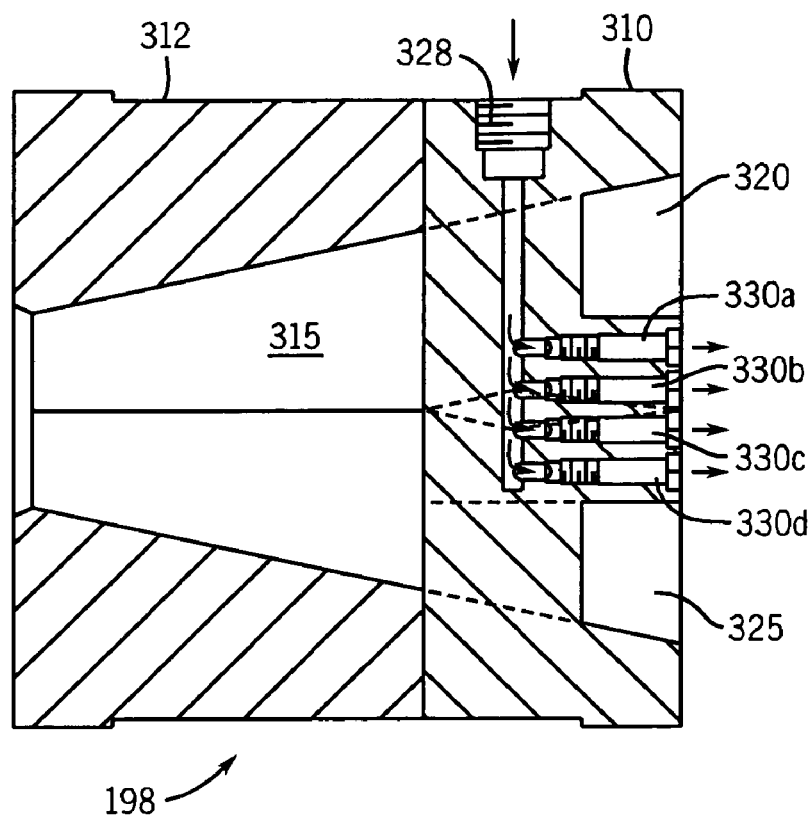

As shown in FIGS. 3–5, container 198 is comprised into sections and has orifice 315 therethrough. The container 198 is preferably round like most of the dies. Contained within orifice 315 are pins 330. The pins 330 are used to inject gas into the orifice and into the extruded material as it travels through the orifice and is divided into two channels. The material is divided when it reaches a point at which the pins are mounted. As will be explained below, a dividing plane 319 is used to separate the material and move it into the channels. The pins are screwed into the cylinder and have built-in check valves to prevent backflow of the material into gas injection ports. The pins are threaded and preferably have hex heads so they can be easily removed and replaced.

More specifically, FIGS. 3, 4 and 5, show the pressurized container 198 in various views. As mentioned previously, the container 198 is preferably cylindrically shaped as best shown in FIG. 4. The container 198 is made up of two pieces: a first section 310 and a second section 312. Fasteners (not shown) attach the first section 310 to the second section 312. Holes 313 for receiving the fasteners are also shown in FIG. 4. Inside the container 198 is an orifice 315. Within the orifice 315 is a center section 318 which contains a dividing plane 319. On each side of the center section 318 is a channel, first channel 320 and second channel 325. Main port 329 is in communication with pin ports 328$a$, $b$, $c$, and $d$. The pin ports contain injection pins 330$a$, $b$, $c$, and $d$. The pins 330 are used to channel gas into material 140 as it moves into the orifice (e.g., A) and is divided by the dividing plane 319 and pushed into channels 320 and 325 before it exits (e.g., B). The pins 330 are preferably similar to those provided by Bauer Compressors, Inc. of Norfork, Va. The gas assist injection pins are offered in various sizes and materials and are designed to fit by screwing a threaded portion into the pin port.

The pins 330 preferably have a hex head or an allen-wrench cavity so that the pins can be tightened into the ports. These pins can be quickly mounted and removed for easy maintenance and minimum downtime. As also mentioned previously, a gas, such as $CO_2$, is injected into the main port with a pump which is connected to a generator and temperature controller. A connector valve may be threaded into the port 329 to connect to the pump via hose. The pins have a stop cock so that flow is only in one direction, i.e., outward. Therefore, material cannot be accidentally sucked up into the injection pins. Preferably, four pins are arranged in the vertical column like the order as best shown in FIG. 4. A mounting bracket 340 may be used to mount the pins to the cylinder or container 198. The pins 330$a$, 330$b$, 330$c$, and 330$d$ are arranged in descending order from first channel 320 and the second channel 325.

Figure 6:
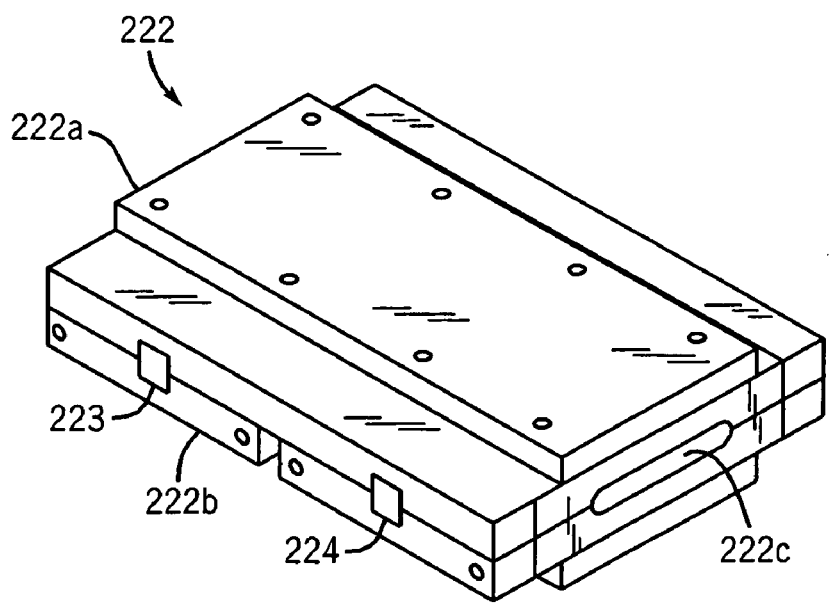
FIGS. 6 and 7 show a tempering block according to one embodiment of the present invention.
Figure 7:
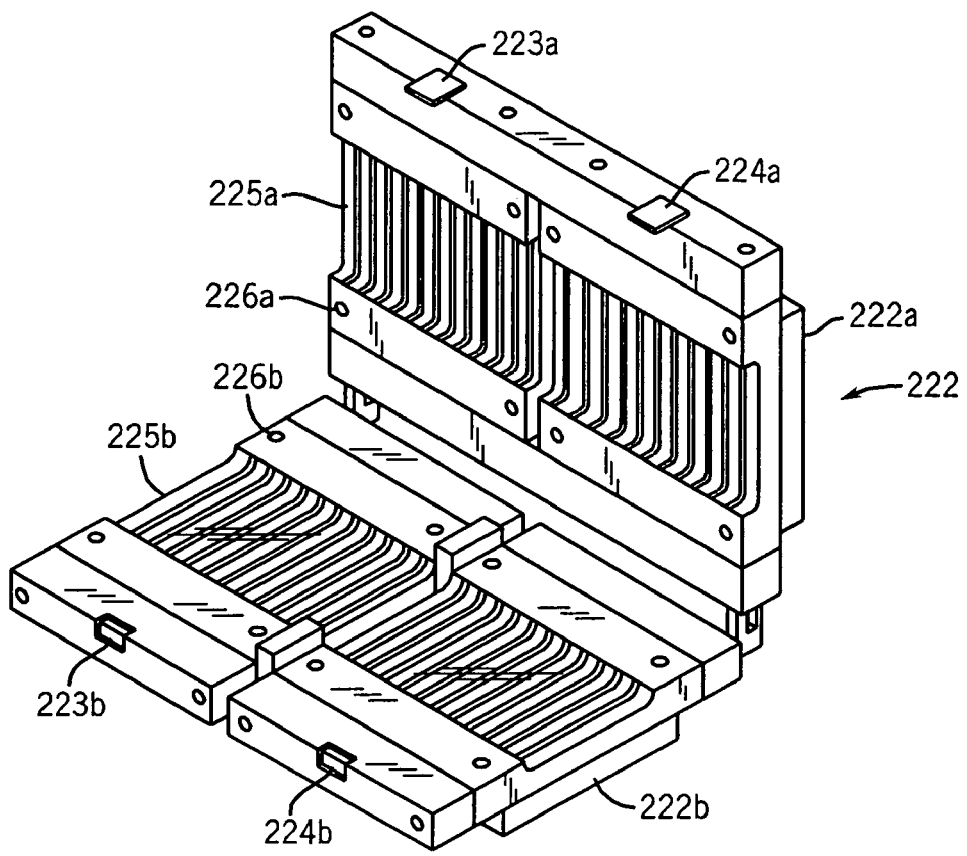
Figure 8:
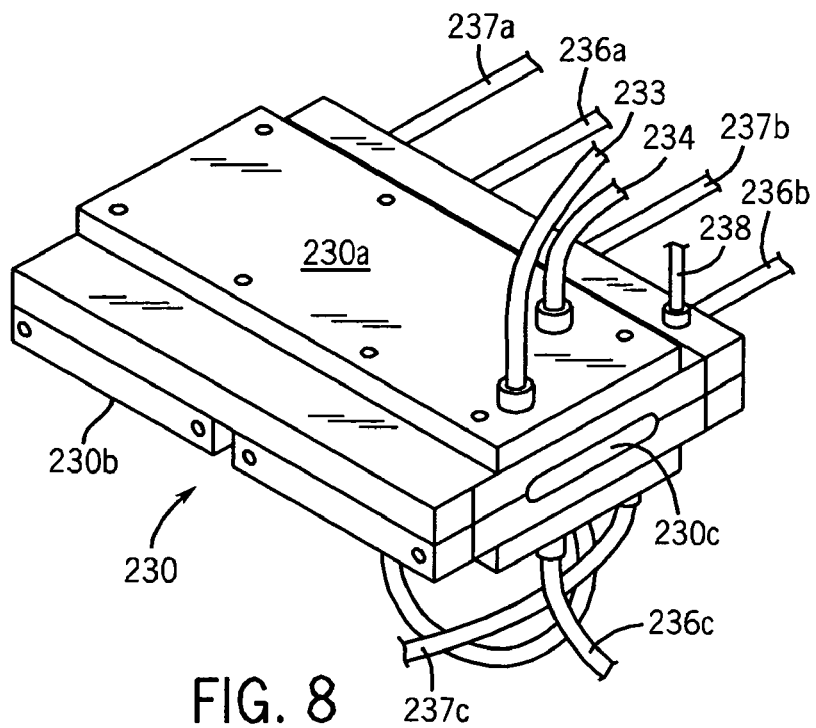
FIGS. 8 and 9 show a lubricating assembly according to one embodiment of the present invention.
Figure 9:
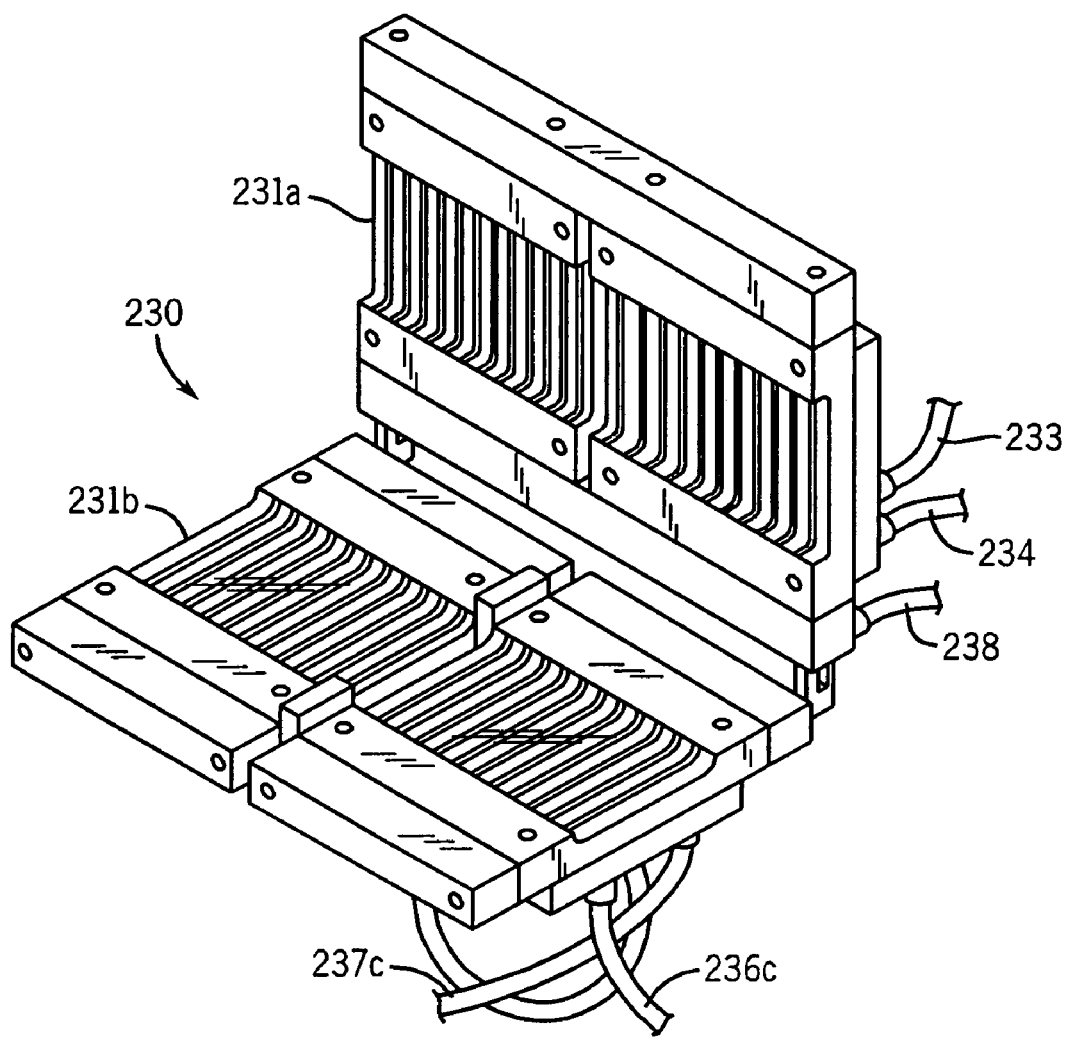

Tempering block 222 is best shown in FIGS. 6 and 7. The calibrator 230 is best shown in FIGS. 8 and 9. The makeup of the tempering block and calibrator are very similar. However, preferably the tempering block 222 does not contain any attached hoses for circulating lubricating fluids for heating and/or cooling the tempering block. Alternatively, hoses are connected to the calibrator for heating and cooling the calibrator plates preferably by circulating a lubricating fluid that has been heated or cooled. The plates in the tempering block and the calibrator are movable for specific sizing of the plank's profile. For example, plates for forming a smaller profiled plank can be replaced with plates for forming a larger profiled plank. The plates can also be removed for cleaning as some extruded material may be deposited thereon.

More specifically, FIG. 6 shows tempering block 222, and which has a top section 222a and a bottom section 222b. The top and bottom sections close to create channel 222c. The tempering block sections are secured by fasteners or latches 223 and 224. FIG. 7 shows the tempering block sections 222a and 222b opened. Inside each section is a series of plates 225. Upper plates 225a are secured by fasteners 226a. Bottom plates 225b are secured by fasteners 226b. The plates 225 can be removed to change the profile and/or shape of the extruded material to make planks of various shapes.

Attached to the tempering block 222, and shown in FIG. 8, is a lubricating assembly or calibrator 230. Calibrator 230 also has a top 230a and bottom 230b which when enclosed form a channel 230c. Various hoses, e.g., a hot fluid hose 233 and a cold fluid hose 234, are connected to the top and the bottom sections of the lubricating assembly 230. In the preferred embodiment, cold and hot lubrication liquids flow through these hoses; for example, water may be used as such a liquid. Other assembly 230 hoses 236a–236c as well as 237a–237c may be present. Other hoses such as 238 may provide negative pressure or a vacuum to the assembly 230.

Figure 10:
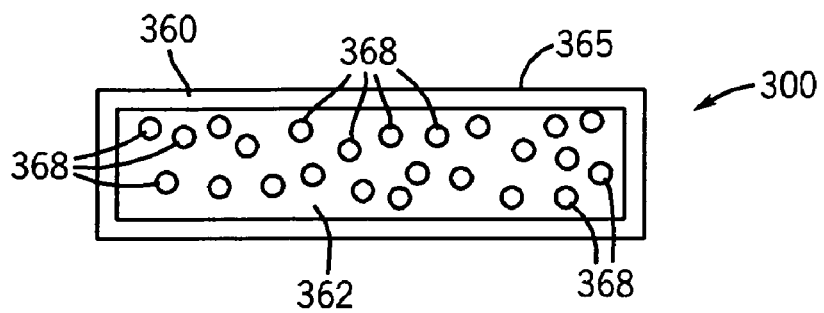
FIG. 10 shows a plank produced by the present invention.

As mentioned, the assembly or calibrator 230 helps shape the plank as it moves through the system 100. Preferably, as shown in FIG. 10, the calibrator aids in forming on the plank 300 an outer skin 360 around the inner core 362. Further, a smooth surface 365 is produced by the lubrication circulated by the assembly 230. The smooth surface 365 preferably seals the plank 300 and prevents moisture dirt and other materials from being absorbed into cells 368 of the foam-like plank core 362.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

For example, although stainless steel is preferred for the various pieces of the apparatus, any strong and rugged material could be used in its place. In addition, the plank does not need to be fabricated from the disclosed materials but could be fabricated from virtually any suitable materials.

Further, the individual components of the apparatus need not be formed in the disclosed shapes, or assembled in the disclosed configuration, but could be provided in virtually any shape, and assembled in virtually any configuration. For example the container need not be a cylinder. Further, although the extruder and dies are described in one embodiment as a physically separate module, it will be manifest that they may be integrated into the devices, such as the container, with which they is associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

We hereby claim:

1. An apparatus for producing a composite plank comprising:
    a) an extruder;
    b) a plurality of dies after the extruder, wherein the dies comprise an adapter die, a transition die, a stranding die, a molding die and a setting die;
    c) a cylinder after the extruder, wherein the cylinder is mounted after the adapter die and before the transition die, the cylinder including an orifice for injecting a gas into a material, wherein the cylinder is pressurized and contains a plurality of pins located in the center of the orifice and between two channels so that material extruded therein is uniformly injected with gas to cause it to foam before moving into a die;
    d) a lubricating assembly to shape and form a composite plank from the material;
    e) a cooling tank after the lubricating assembly;
    f) a conveyor having opposing belts for pulling the plank through the cooling tank;
    g) a saw connected to the conveyor; and
    h) a stacking table adjacent the saw.

2. The apparatus of claim 1, further comprising at least one of: a gas generator, a pressure booster, and a temperature controller connected to the cylinder.

3. The apparatus of claim 1, further comprising a tempering block connected to the assembly so that the extruded material can continue to expand to a preferred size in a controlled environment before being heated or cooled.

4. A system for making a wood and plastic composite comprising:
    a) a hopper for receiving wood and plastic material;
    b) an extruder for mixing the material;
    c) a plurality of dies after the extruder for shaping the material after exiting the extruder, wherein the dies comprise an adapter die, a transition die, a stranding die, a molding die and a setting die;
    d) a pressurized container after the extruder for injecting gas into the material to create a foam-like plank, the pressurized container comprising a cylinder, wherein the cylinder is mounted after the adapter die and before the transition die, the cylinder including an orifice for injecting a gas into a material, wherein the cylinder is pressurized and contains a plurality of pins located in the center of the orifice and between two channels so that material extruded therein is uniformly injected with gas to cause it to foam before moving into a die;
    e) a calibrator for shaping the plank through heating and cooling;
    f) a tank for further cooling the plank; and
    g) a conveyor for carrying the plank through the tank.

5. The system of claim 4 further comprising: at least one of a temperature controller and a lubricator connected to the calibrator; at least one of a gas generator, a pressure booster, and a temperature controller connected to the container; and a tempering block connected to the calibrator so that the extruded material can continue to expand to a preferred size in a controlled environment before being heated or cooled.

* * * * *

UNITED STATES PATENT AND TRADEMARK OFFICE
CERTIFICATE OF CORRECTION

PATENT NO. : 7,186,102 B2 Page 1 of 1
APPLICATION NO. : 10/699599
DATED : March 6, 2007
INVENTOR(S) : Terry C. Laver et al.

It is certified that error appears in the above-identified patent and that said Letters Patent is hereby corrected as shown below:

IN THE SPECIFICATION

At Column 9, line 15, please delete "Layer" and substitute therefore --Laver--.

At Column 10, line 34, in Table 3, please delete the first heading

"Density
(lb.
ft-3)"

and substitute therefor

--Density
(lb/ft$^3$)--.

At Column 11, in the third line after Table 4, please delete "tom" and substitute therefor --the top and bottom--.

Signed and Sealed this

Eighth Day of May, 2007

JON W. DUDAS
*Director of the United States Patent and Trademark Office*